United States Patent Office 2,915,141
Patented Dec. 1, 1959

2,915,141

POLYMERIZATION INHIBITOR

Oscar A. Sarabia, Texas City, Tex., assignor to Monsanto Chemical Company, St. Louis, Mo., a corporation of Delaware No Drawing. Application December 23, 1957
Serial No. 704,266

12 Claims. (Cl. 183—115)

This invention relates to the inhibition of polymerization. More particularly, it relates to the inhibition of undesirable polymer growth in processing equipment during the purification of acetylene by absorption techniques.

When acetylene is produced from hydrocarbons, e.g., by the well known electric arc process, by thermal decomposition or dissociation, or by partial oxidation, the acetylene-containing gaseous mixture produced generally contains so-called "poly-formers," that is, compounds of the nature of biacetylene, for example, which polymerize to solid materials under certain conditions of temperature, pressure, etc. The purification of such an acetylenic gas mixture is usually accomplished by the selective action of suitable solvents. A number and variety of solvents have been proposed among which may be mentioned, for example, water, acetone, dimethylformamide, butyrolactone, N-methyl pyrrolidone, triethyl phosphate, and diethyl carbonate. The normal procedure for separation and recovery of acetylene from gas mixtures by means of absorption in a preferential liquid solvent comprises absorbing the acetylene in the solvent in an absorption tower, removing those gases which are slightly soluble in the solvent in a stripping tower and then subjecting the acetylene solution to desorption which is effected by means of increased temperatures, decreased pressures, or a combination of both. However, in these conventional methods of absorption and stripping the gas mixture is exposed to conditions under which the poly-formers mentioned above polymerize and provision must be made in all such processes for periodic removal of the polymeric substances to prevent their excessive build-up in the solvent in the absorption and stripping steps. This requires additional, specialized filtration equipment as well as added process steps which are costly with respect to both time and capital expense. Frequently, too, the polymeric material collects in the less accessible parts of the system, fouling up equipment lines, columns and the like. Usually, too, the polymeric material as formed is of such a small particle size that it plugs the filter used for separating it, so that only a small amount can be filtered in each operation and an inordinate length of time is required to wring the filter cake dry.

Methods have been proposed for removal of certain of the known poly-formers from the gas stream, but these are cumbersome and expensive since they require additional process steps prior to the usual solvent purification operation which utilize special equipment and significant quantities of special chemicals for treating purposes.

It is an object of the present invention, therefore, to provide a method whereby undesirable polymer growth during the solvent purification of acetylene is inhibited. Other objects and advantages of the invention will be apparent from the following description and the appended claims.

According to the invention, the formation of polymers in an acetylene purification system wherein a solvent is employed for the selective absorption of acetylene from an acetylene-containing gas stream derived from hydrocarbons is effectively inhibited by incorporating in said solvent a minor amount of a nitrophenol such as o-nitrophenol, 2,4,dinitrophenol, 2,4,6-trinitrophenol, and the like.

The invention is illustrated in the following examples which, however, are not to be construed as limiting it in any manner whatsoever.

EXAMPLE I

The testing apparatus consisted of a series of Pyrex gas-washing bottles (500-ml. capacity) connected in parallel to gas-inlet and outlet manifolds. The distributing outlets on the gas-inlet manifold all contained steel needle valves and rotameters for regulating and measuring the gas flow. Three sets of tests were conducted. In the first, two of the bottles were charged with the acetylene solvent, N-methyl pyrrolidone, alone while one was filled with this solvent containing 0.5% by weight of o-nitrophenol. In the second set, one bottle was filled with N-methyl pyrrolidone alone to serve as a control, another contained N-methyl pyrrolidone to which 0.1% by weight of o-nitrophenol had been added and the third was charged with this same solvent containing 0.25% by weight of o-nitrophenol. The third set was a duplicate of the first except that only one control was employed instead of two. The same procedure was followed in each set of tests. The solvent was carefully weighed into each bottle so that the same amount, 400 g. (approx. 400 ml.), was used in each one. An acetylene-containing gas stream was bubbled through the liquid in the bottles at a fixed rate of about 600 ml. per min. for a period of 48 hr. The gas employed was the effluent stream produced by the oxidation of methane in a suitable reactor. It was "tapped" from a process line in an acetylene plant at a point downstream from the furnace or reactor after the gas had been quenched and filtered to remove any soot present. This gas was then successively passed through a compressor, a pressure regulator, and a chilled surge container prior to admittance into the gas-inlet manifold.

After the bubblers had been in operation for 48 hr., the bottles were disconnected and the solutions were weighed. The contents were then transferred to clean glass bottles and analyzed to determine the amounts of water and polymer present. Polymer determinations were made as follows: Ten-ml. samples of the solutions were pipetted into 65-ml. ignition tubes. The solutions were frozen solid by immersing the tubes in a trichloroethylene-Dry Ice bath and the tubes were then sealed by means of an oxygen-natural gas torch. After allowing them to warm up to room temperature, the tubes were placed in an oven maintained at 105° C. for 10 hours. At the end of this time the tubes were removed, allowed to cool to room temperature, then further cooled to solidify the contents again by freezing, and opened. The opened tubes were allowed to warm up to room temperature after which the contents of each were poured into separate Erlenmeyer flasks and 15 ml. of 1 N $H_2SO_4$ was added to each flask. The flasks were heated on a hot plate until the mixtures therein were brought to a near boil. The contents of each flask were then filtered on separate tared gooch crucibles, the flasks being rinsed with hot water and the washings being poured onto the filters. The crucibles were dried in a vacuum oven at 100° C. for 1 hr., cooled in a desiccator and weighed to determine the amount of polymer present in each sample.

Results of the tests are presented in Table I.

Table I

| Sample No. | XII-1 | XII-2 | XII-10 | XVI-1 | XVI-2 | XVI-3 | X-1 | X-6 |
|---|---|---|---|---|---|---|---|---|
| Amt. of o-NP[1] Added (Wt. Percent of Solvent) | None | None | 0.5 | None | 0.1 | 0.25 | None | 0.5 |
| Wt. Gained by Solvent (g.) | 11.5 | 11.4 | 11.4 | 15.0 | 15.2 | 15.4 | 11.3 | 10.8 |
| Percent Water in Solvent: | | | | | | | | |
| Initial | 0.90 | 0.90 | 0.90 | 0.90 | 0.90 | 0.90 | 0.63 | 0.63 |
| Final | 2.09 | 2.12 | 2.15 | 2.64 | 2.66 | 2.66 | 2.10 | 1.84 |
| Percent Polymer | 1.35 | 1.35 | 0.75 | 1.78 | 1.05 | 0.85 | 1.31 | 0.75 |
| Percent Polymer in Inhibited Sol'n./Percent Polymer in Uninhibited Sol'n | | | 0.55 | | 0.59 | 0.47 | | 0.57 |

[1] o-Nitrophenol.

EXAMPLE II

Using the apparatus and following the procedure described in Example I, duplicate tests were made using 2,4,6-trinitrophenol (picric acid) as the inhibitor in N-methyl pyrrolidone solvent. Results are presented in Table II.

Table II

| Sample No. | XII-1 | XII-2 | XII-8 | IX-1 | IX-6 |
|---|---|---|---|---|---|
| Amt. of Inhibitor Added (Wt. Percent of Solvent) | None | None | 0.5 | None | 0.5 |
| Wt. Gained by Solvent (g.) | 11.5 | 11.4 | 11.6 | 13.7 | 13.3 |
| Percent Water in Solvent: | | | | | |
| Initial | 0.90 | 0.90 | 0.90 | 0.63 | 0.63 |
| Final | 2.09 | 2.12 | 2.06 | 2.02 | 1.78 |
| Percent Polymer | 1.35 | 1.35 | 0.76 | 1.42 | 0.83 |
| Percent Polymer in Inhibited Sol'n./Percent Polymer in Uninhibited Sol'n | | | 0.56 | | 0.58 |

EXAMPLE III p-Nitrophenol and 2,4-dinitrophenol were tested as inhibitors according to the procedure described in Example I, control samples being run in each test. Results are presented in Table III.

Table III

| Sample No. | XIV-8 | XIV-11 | XIII-1 | XIII-5 |
|---|---|---|---|---|
| Inhibitor Added | None | p-Nitrophenol. | None | 2,4-dinitrophenol. |
| Amt. of Inhibitor Added (Wt. Percent of Solvent) | | 0.5 | | 0.5 |
| Wt. Gained by Solvent (g.) | 17.8 | 17.4 | 15.5 | 16.0 |
| Percent Water in Solvent: | | | | |
| Initial | 0.90 | 0.90 | 0.90 | 0.90. |
| Final | 1.94 | 2.09 | 2.26 | 2.25. |
| Percent Polymer | 2.28 | 1.77 | 1.76 | 1.05. |
| Percent Polymer in Inhibited Sol'n/Percent Polymer in Uninhibited Sol'n. | | 0.81 | | 0.66. |

The data from Examples I–III demonstrate that acetylene-containing gas produced from hydrocarbons contains polymerizable compounds which polymerize under conditions such as are used in the process for purifying or recovering acetylene from such gases by absorption in a solvent having preferential solvent action for acetylene. The data also convincingly demonstrate that such polymerization is inhibited if a nitrophenol is incorporated in the solvent. Decreases in polymer production ranging from 19% to 53% have been realized using the various nitrophenols.

EXAMPLE IV

A gas mixture obtained by the partial combustion of methane with oxygen in a suitable furnace containing the following constituents in mol percent

| | |
|---|---|
| $C_2H_2$ | 7.5 |
| $CH_4$ | 4.0 |
| CO | 26.7 |
| $CO_2$ | 3.0 |
| $H_2$ | 56.0 |
| $N_2$ | 1.3 |
| Argon, biacetylene, acetylene polymers, polyformers, etc. | 1.4 | is compressed and fed under pressure into the middle of an absorption tower. This is a tower containing trays, pans, or ferrules of any suitable type. The gaseous mixture ascends into the upper portion of the tower coming into contact therein with descending liquid N-methyl pyrrolidone containing in solution about 0.5% by weight of o-nitrophenol admitted at the top of the tower. As the two streams of ascending vapor and descending liquid come into contact, the acetylene in the gas dissolves in the N-methyl pyrrolidone so that by the time the liquid solvent reaches the bottom of the absorber it is saturated with acetylene. It contains also small amounts of the other volatile constituents which are slightly soluble such as carbon dioxide and ethylene. An overhead gas essentially free of acetylene is withdrawn from the top of the absorber.

The solution of acetylene from the bottom of the absorber is introduced into a desorber where the pressure of the gas in contact with the solution is reduced with the result that the major portion of the less soluble non-acetylenic gases is flashed off. These less-soluble gases are returned to the scrubber for recovery of any acetylene contained in them. The acetylene-saturated solution of N-methyl pyrrolidone leaving the desorber passes through a heater wherein its temperature is raised and is then conducted into a series of stages or zones wherein the solvent is subjected to progressively lower pressures and whereby the gases dissolved in the solvent are liberated. The gases liberated in each stage or zone are removed from a lower pressure stage and injected into the next higher pressure stage by means of high velocity steam jets, the gas pressure in the stage of highest pressure being maintained sufficiently high so that there is a flow of gas from this stage to the bottom of the desorber. Pure concentrated acetylene is withdrawn from an intermediate section of the desorber. The liquid solvent from the bottom of the stage of lowest pressure substantially completely freed of acetylene is pumped to a solvent desorber where it is freed of remaining impurities and recycled to the absorption tower.

In this system where o-nitrophenol is incorporated in the solvent, polymerization of the unsaturated polymerizable materials in the gas being treated is held to a minimum. No appreciable amounts of polymer are deposited in the solvent or in the equipment thus obviating the usual processing difficulties arising from plugged pipes, trays, etc.

The effectiveness of the inhibitors is not restricted to those conditions given in the examples. In general, only minor quantites of the inhibitors are required although the amount used depends somewhat on the amount of poly-formers present in the gas stream and the degree of inhibition desired. Concentrations of the nitrophenol in the range from about 0.01% to about 5% by weight of the solvent are suitable, with concentrations from about 0.1 to about 1% being preferred. The stabilizers or inhibitors may, of course, be employed in as great a concentration as desired.

The inhibitors of the invention are not restricted to use with only N-methyl pyrrolidone as set out in the examples above. They may be used to inhibit polymerization in other like organic solvents such as butyrolactone, for example. In any solvent system where a selective solvent is used for the recovery of acetylene from a gas stream containing it in combination with other gases including poly-formers by absorption in the solvent and subsequent stripping therefrom, polymerization of such poly-formers is effectively inhibited by the presence of a minor amount of a nitrophenol in the solvent. To inhibit polymer formation during the absorption-stripping operation, the inhibitors can be added directly to the solvent feed stream, or they can be introduced as a solution of the desired concentration at some point in the absorption system. The inhibiting power of the nitrophenols is not affected by continual re-use; hence, recirculation of the solvent may be safely practiced with the inhibiting power of the additives of the invention suffering no significant decrease in effectiveness.

What is claimed is:

1. In a process for the recovery of acetylene from an acetylene-containing gas stream derived from hydrocarbons wherein the acetylene-containing gas stream is contacted with a solvent for selective absorption of acetylene therefrom and said solution is thereafter stripped to recover acetylene therefrom, the improvement which comprises incorporating a nitrophenol in the solvent employed in an amount in the range from about 0.01% to about 5% by weight of the solvent, said solvent being non-reactive with a nitrophenol under the conditions employed.

2. In a process for the recovery of acetylene from an acetylene-containing gas stream derived from hydrocarbons wherein the acetylene-containing gas stream is contacted with a solvent for selective absorption of acetylene therefrom and said solution is thereafter stripped to recover acetylene therefrom, the improvement which comprises incorporating a nitrophenol in the solvent employed in an amount in the range from about 0.1% to about 1% by weight of the solvent, said solvent being non-reactive with a nitrophenol under the conditions employed.

3. In a process for the recovery of acetylene from an acetylene-containing gas stream derived from hydrocarbons wherein the acetylene-containing gas stream is contacted with a solvent for selective absorption of acetylene therefrom and said solution is thereafter stripped to recover acetylene therefrom, the improvement which comprises incorporating o-nitrophenol in the solvent employed in an amount in the range from about 0.1% to about 1% by weight of the solvent, said solvent being non-reactive with o-nitrophenol under the conditions employed.

4. In a process for the recovery of acetylene from an acetylene-containing gas stream derived from hydrocarbons wherein the acetylene-containing gas stream is contacted with a solvent for selective absorption of acetylene therefrom and said solution is thereafter stripped to recover acetylene therefrom, the improvement which comprises incorporating 2,4,6-trinitrophenol in the solvent employed in an amount in the range from about 0.1% to about 1% by weight of the solvent, said solvent being non-reactive with 2,4,6-trinitrophenol under the conditions employed.

5. In a process for the recovery of acetylene from an acetylene-containing gas stream derived from hydrocarbons wherein the acetylene-containing gas stream is contacted with a solvent for selective absorption of acetylene therefrom and said solution is thereafter stripped to recover acetylene therefrom, the improvement which comprises incorporating 2,4-dinitrophenol in the solvent employed in an amount in the range from about 0.1% to about 1% by weight of the solvent, said solvent being non-reactive with 2,4-dinitrophenol under the conditions employed.

6. In a process for the recovery of acetylene from an acetylene-containing gas stream derived from hydrocarbons wherein the acetylene-containing gas stream is contacted with a solvent for selective absorption of acetylene therefrom and said solution is thereafter stripped to recover acetylene therefrom, the improvement which comprises incorporating p-nitrophenol in the solvent employed in an amount in the range from about 0.1% to about 1% by weight of the solvent, said solvent being non-reactive with p-nitrophenol under the conditions employed.

7. In a process for the recovery of acetylene from an acetylene-containing gas stream derived from hydrocarbons wherein the acetylene-containing gas stream is contacted with N-methyl pyrrolidone for selective absorption of acetylene therefrom and said N-methyl pyrrolidone solution is thereafter stripped to recover acetylene therefrom, the improvement which comprises incorporating a nitrophenol in said N-methyl pyrrolidone solvent in an amount in the range from about 0.01% to about 5% by weight of the solvent.

8. In a process for the recovery of acetylene from an acetylene containing gas stream derived from hydrocarbons wherein the acetylene-containing gas stream is contacted with N-methyl pyrrolidone for selective absorption of acetylene therefrom and said N-methyl pyrrolidone solution is thereafter stripped to recover acetylene therefrom, the improvement which comprises incorporating a nitrophenol in said N-methyl pyrrolidone solvent in an amount in the range from about 0.1% to about 1% by weight of the solvent.

9. In a process for the recovery of acetylene from an acetylene-containing gas stream derived from hydrocarbons wherein the acetylene-containing gas stream is contacted with N-methyl pyrrolidone for selective absorption of acetylene therefrom and said N-methyl pyrrolidone solution is thereafter stripped to recover acetylene therefrom, the improvement which comprises incorporating o-nitrophenol in said N-methyl pyrrolidone solvent in an amount in the range from about 0.1% to about 1% by weight of the solvent.

10. In a process for the recovery of acetylene from an acetylene-containing gas stream derived from hydrocarbons wherein the acetylene-containing gas stream is contacted with N-methyl pyrrolidone for selective absorption of acetylene therefrom and said N-methyl pyrrolidone solution is thereafter stripped to recover acetylene therefrom, the improvement which comprises incorporating 2,4,6-trinitrophenol in said N-methyl pyrrolidone solvent in an amount in the range from about 0.1% to about 1% by weight of the solvent.

11. In a process for the recovery of acetylene from an acetylene-containing gas stream derived from hydrocarbons wherein the acetylene-containing gas stream is contacted with N-methyl pyrrolidone for selective absorption of acetylene therefrom and said N-methyl pyrrolidone solution is thereafter stripped to recover acetylene therefrom, the improvement which comprises incorporating 2,4-dinitrophenol in said N-methyl pyrrolidone solvent in an amount in the range from about 0.1% to about 1% by weight of the solvent.

12. In a process for the recovery of acetylene from an acetylene-containing gas stream derived from hydrocarbons wherein the acetylene-containing gas stream is contacted with N-methyl pyrrolidone for selective absorption of acetylene therefrom and said N-methyl pyrrolidone solution is thereafter stripped to recover acetylene therefrom, the improvement which comprises incorporating p-nitrophenol in said N-methyl pyrrolidone solvent in an amount in the range from about 0.1% to about 1% by weight of the solvent.

References Cited in the file of this patent

UNITED STATES PATENTS 2,664,997 Eck Jan. 5, 1954